United States Patent [19]

Ohsawa et al.

[11] 3,971,709

[45] July 27, 1976

[54] METHOD FOR FORMING SMOOTH CURED COATED FILMS

[75] Inventors: Akira Ohsawa, Yokohama; Ryosuke Yamazaki, Kamakura; Osamu Ohe, Tokyo; Ryoji Okamura, Chigasaki, all of Japan

[73] Assignee: Nippon Oils and Fats Company Limited, Tokyo, Japan

[22] Filed: Oct. 15, 1974

[21] Appl. No.: 514,789

[30] Foreign Application Priority Data

Oct. 20, 1973  Japan.............................. 48-117393

[52] U.S. Cl. ................................................ 204/181
[51] Int. Cl.$^2$......................................... C25D 13/06
[58] Field of Search ...................................... 204/181

[56] References Cited
UNITED STATES PATENTS 3,575,832   6/1968   Johnson.............................. 204/181
3,679,572   7/1972   Smith et al.......................... 204/181

*Primary Examiner*—Howard S. Williams
*Attorney, Agent, or Firm*—Stevens, Davis, Miller & Mosher

[57] ABSTRACT

Smooth cured coated films having excellent properties are formed by electrodepositing and coating a film on a cathode of an electroconductive material in an electrodeposition bath containing a cationically electrodepositing composition, which is composed of a polymer resin having amino groups and acryloyl or methacryloyl groups and of acrylic or methacrylic acid, and curing the coated film by the irradiation of an ionic radiation.

11 Claims, No Drawings

METHOD FOR FORMING SMOOTH CURED COATED FILMS

The present invention relates to a method for forming smooth cured coated films, wherein a cationically electrodepositing composition, which is composed of a cationic polymer resin having amino groups and at least one of acryloyl groups and methacryloyl groups and of at least one of acrylic acid and methacrylic acid as essential components, and is curable by ionic radiation, is deposited electrochemically on an electroconductive material used as a cathode by a cathodic electrodeposition method, and the deposited coated film is cured by an ionic radiation.

Recently, activation energies, particularly electron ray and ultraviolet ray have been practically used as a means for curing paints in place of conventional heat energy. Because, when activation energies are used, coated films can be rapidly cured at room temperature.

It has been publicly known that vinyl monomers are radically polymerized by the action of ionic radiation in an inert gas atmosphere, and there have been proposed a large number of methods, wherein a resin having α, β-ethylenically unsaturated bonds is cured by electron ray in an inert gas atmosphere. However, most paints curable by ionic radiation are highly viscous and are poor in workability coatings. In order to obviate these drawbacks, a large numbers of vinyl monomers, such as styrene, lower alkyl ester of acrylic acid or methacrylic acid, and the like, or low molecular weight oligomers having vinyl groups are generally used as a diluent.

However, since these low molecular weight diluents are generally volatile, they volatilize at the coating operation and at the irradiation of ionic radiation to cause deterioration of the working environment, contamination of air and economic loss.

Meanwhile, the electrodeposition coating method, which has prevailed widely, is superior to other coating methods in labor-saving, prevention of public nuisance, and uniformity of coated film.

However, resins which are generally used in the electrodeposition method at present, are anionic resins to be deposited on the anode, and therefore the metal matrix of the anode and the film previously coated on the metal matrix surface by a chemical treatment are always dissolved out by the electrochemical reaction of at the electrodeposition and further the resulting ions are again incorporated into the newly formed coated film by the electrochemical reaction. The resulting coated film is contaminated and is insufficient in the coating properties, such as corrosion resistance, alkali resistance, solvent resistance and the like.

The inventors have made various investigations in order to solve the above described drawbacks, and found that, when the cathodic electrodeposition and the curing by ionic radiation are combined, a coated film deposited on a cathode is cured by the irradiation of a small absorbed dose of ionic radiation, and accomplished the present invention.

That is, the present invention provides a method for forming smooth cured coated films, which comprises cationically electrodepositing and coating a film on an electroconductive material in an electrodeposition bath containing a cationically electrodepositing composition, which is composed of a polymer resin having amino groups and at least one of acryloyl groups and methacryloyl groups and at least one of acrylic acid and methacrylic acid, by using said electroconductive materials as a cathode, and curing said coated film by the irradiation of an ionic radiation.

According to the present invention, a small amount of acrylic acid or methacrylic acid remaining in the deposited coated film acts as a crosslinking agent by the irradiation of ionic radiation and is consumed, and therefore substantially no unpleasant smell is generated. Moreover, hydrogen which is the main component of cathode gas does not disturb the curing of the deposited coated film by the ionic radiation, and it seems that hydrogen is rather effective for preventing the polymerization inhibition action of oxygen.

The polymer resin to be used in the present invention, which has a cationically electrodepositing property and is curable by the ionic radiation, is characterized in that the resin has amino groups and at least one of acryloyl groups and methacryloyl groups. The resin is generally classified into the following groups (A)–(D), but the resin is not limited thereto.

A. Glycidyl group-containing acrylic copolymer base resin.
B. Amino group-containing acrylic copolymer base resin or amino group-containing vinyl copolymer base resin.
C. Glycidyl group-containing acrylic compound/amino group-containing acrylic compound copolymer base resin or glycidyl group-containing acrylic compound-/amino group-containing vinyl compound copolymer base resin.
D. Epoxidized polyalkadiene base resin.

The glycidyl group-containing acrylic copolymer base resin (A) means copolymer resins prepared in the following manner. An α,β-ethylenically unsaturated compound having a glycidyl group, such as glycidyl acrylate, glycidyl methacrylate, N-glycidyl acrylamide, N-glycidyl methacrylamide or the like, is copolymerized with an unsaturated monomer copolymerizable therewith, and then an organic amino compound is added to the glycidyl groups to introduce amino groups into the copolymer, and further at least one of acrylic acid and methacrylic acid is added to the remaining glycidyl groups to introduce at least one of acryloyl groups and methacryloyl groups into the side chain of the copolymer.

As the unsaturated monomer copolymerizable with the α,β-ethylenically unsaturated compound having a glycidyl group, mention may be made of, for example, ethyl acrylate, butyl acrylate, methyl methacrylate, ethyl methacrylate, butyl methacrylate, 2-ethylhexyl acrylate, acrylonitrile, 2-hydroxyethyl acrylate, 2-hydroxyethyl methacrylate, 2-hydroxypropyl methacrylate, styrene, α-methylstyrene, vinyltoluene, vinyl acetate, vinyl propionate, acrylamide, N-alkoxyacrylamide, diethyl maleate and the like.

As the organic amino compound to be added to the glycidyl group, secondary amine is most preferably used, and the amine may be used together with primary amine and polyvalent amine. Typical examples of these organic amino compounds are, for example, diethylamine, diisopropylamine, dibutylamine, diamylamine, morpholine, diisopropanolamine, n-butylamine, monoethanolamine, ethylenediamine, diethylenetriamine, ethylaminoethanol, ethylaminoisopropanol and the like.

The resin (B) of amino group-containing acrylic copolymer base or of amino group-containing vinyl copolymer base means copolymer resins prepared in the following manner. An unsaturated compound having an amino group, such as aminoethyl acrylate, aminobutyl acrylate, methylaminoethyl acrylate, diethylaminoethyl acrylate, aminoethyl methacrylate, dimethylaminoethyl methacrylate, N-vinylpyrazole, N-vinylimidazole, N-vinylimidazoline, N-vinylpiperidine, N-vinylindole or the like, is copolymerized with an $\alpha,\beta$-ethylenically unsaturated carboxylic acid and the same copolymerizable monomer as used in the above described resin (A) to prepare a copolymer having amino groups and carboxyl groups, and then the same $\alpha,\beta$-ethylenically unsaturated compound having a glycidyl group as used in the above resin (A) is added to the carboxyl groups to introduce at least one of acryloyl groups and methacryloyl groups into the copolymer.

As the $\alpha,\beta$-ethylenically unsaturated carboxylic acid, mention may be made of acrylic acid, methacrylic acid, itaconic acid, crotonic acid, maleic acid, fumaric acid, ethyl maleate and the like.

The resin (C) of glycidyl group-containing acrylic compound/amino group-containing acrylic compound copolymer base or of glycidyl group-containing acrylic compound/amino group-containing vinyl compound copolymer base means a combination system of the above described resins (A) and (B), and is prepared in the following manner. An $\alpha,\beta$-ethylenically unsaturated compound having a glycidyl group, an unsaturated compound having an amino group and an unsaturated monomer copolymerizable therewith are copolymerized to prepare a copolymer having amino groups, and then at least one of acrylic acid and methacrylic acid is added to the glycidyl groups to introduce at least one of acryloyl groups and methacryloyl groups into the copolymer.

The epoxidized polyalkadiene base resin (D) means polymer resins prepared in the following manner. A polyalkadiene, such as 1,2-polybutadiene, 1,4-polybutadiene, polypentadiene, pentadiene-butadiene copolymer or the like, is epoxidized in the conventional manner, and then amino groups and at least one of acryloyl groups and methacryloyl groups are introduced into the epoxidized polyalkadiene in the same manner as described in the above resin (A).

When the above described polymer resins (A)–(D) are produced, the copolymerization reaction of acrylic monomer with other monomer, and the addition reactions of amino groups and at least one of acryloyl groups and methacryloyl groups to the copolymer can be easily carried out by a conventional solution polymerization process in a solvent in the presence of a radical initiator.

As the radical initiator, mention may be made of organic peroxides, such as diisopropyl peroxycarbonate, 2,4-dichlorobenzoyl peroxide, octanoyl peroxide, lauroyl peroxide, t-butyl peroxide, benzoyl peroxide, cyclohexanone peroxide, di-t-butyl di-perphthalate, t-butyl peracetate, t-butyl perbenozate, dicumyl peroxide, t-butyl hydroperoxide, methyl ethyl ketone peroxide, di-t-butyl peroxide, cumene hydroperoxide, 2,5-dimethylhexane-2,5-dihydroperoxide and the like; and azonitrile compounds, such as 2,2'-azobisisobutyronitrile, 2,2'-azobisisopropionitrile and the like.

As the solvent, mention may be made of dimethylformamide; dimethyl sulfoxide; halogenated hydrocarbons, such as trichloroethylene, chloroform, carbon tetrachloride and the like; alcohols, such as isopropyl alcohol, n-butyl alcohol, sec-butyl alcohol, tert-butyl alcohol, isobutyl alcohol, diacetone alcohol and the like; ketones, such as acetone, methyl ethyl ketone, diethyl ketone, methyl butyl ketone, cyclohexanone and the like; ether alcohols, such as methyl cellosolve, ethyl cellosolve, butyl cellosolve and the like; ethers, such as dioxane, tetrahydrofuran and the like. These solvents are used alone or in admixture of at least two solvents. However, among these solvents, hydrophilic solvents are particularly preferable. Further, when acryloyl group and/or methacryloyl group are introduced into the polymer, since there is a fear of gelation of the reaction system due to the thermal polymerization of the polymer, the introduction reaction is preferred to be carried out at about 100°C in the presence of a small amount of polymerization inhibitors, such as hydroquinone, sec-butylcatechol, benzoquinone and the like.

The number of acryloyl groups and/or methacryloyl groups to be contained in the polymer resin should be determined depending upon the desired property of the final product. In general, at least one acryloyl group and/or methacryloyl group is contained in one mole of the polymer resin in order to obtain a sufficiently high crosslinking density in the resin after it is cured. However, when it is intended to introduce more than 6 acryloyl groups and/or methacryloyl groups into the copolymer, the reaction system may gel during the addition reaction, and therefore the number of the acryloyl groups and/or methacryloyl groups contained in the polymer resin is preferred to be within the range of 1–6, particularly 2–3 per one molecule of the polymer resin.

The number of amino groups contained in the polymer resin is preferred to be larger in order to obtain a stable aqueous solution of aqueous dispersion. However, excess amino groups deteriorates the water resistance and other properties of the coated film. While, when the number of amino groups is too small, the water-solubility of the polymer resin lowers. Accordingly, it is preferable that the polymer resin contains amino groups in such an amount that the molecular weight of the resin per one amino group is 300–1,000.

In the present invention, the cationic polymer resin having amino groups and at least one of acryloyl groups and methacryloyl groups is made water-soluble by using acrylic acid and/or methacrylic acid. Further, acrylic acid and/or methacrylic acid can be used together with a small amount of other acids, such as hydrochloric acid, sulfuric acid, phosphoric acid, acetic acid, formic acid and the like.

When the cationic polymer resin is made water-soluble, the resin is neutralized with acrylic acid and/or methacrylic acid in a conventional manner. That is, when a polymer resin having amino groups and at least one of acryloyl groups and methacryloyl groups is added with acrylic acid and/or methacrylic acid and then with water, and the resulting mass is stirred thoroughly at room temperature, a stable aqueous solution or aqueous dispersion can be obtained. The amount of acrylic acid and/or methacrylic acid to be used is 0.3–1.5 equivalents based on the amino groups in the polymer resin. When the amount is smaller than 0.3 equivalent, the water-solubility of the polymer resin lowers, and when the amount is larger than 1.5 equivalents, a large amount of cathode gas is generated and a smooth coated film cannot be obtained.

The thus obtained aqueous solution or dispersion containing the polymer resin and at least one of acrylic acid and methacrylic acid can be used as a cationically electrodepositing paint as such, and further may be used as a cationically electrodepositing paint containing coloring pigment, extending pigment, anti-corrosive pigment, additive, crosslinking agent and other assistants, which can be deposited electrochemically by the cathodic electrodeposition in the form of a mixture with the polymer resin and acrylic acid or methacrylic acid, depending upon the purpose. These cationally electrodepositing paints can be prepared through mixing, dispersing, diluting and filtering steps in the same manner as in the case of the production of conventional paints.

Then, an explanation will be made with respect to the cathodic electrodeposition method of the present invention. In this method, an electric current is passed between a cathode (material to be coated) and an anode in an electrodeposition bath, which is composed of the cathode, the anode and an aqueous solution or dispersion of an electrodepositing composition, to form an electrodeposited coated film on the cathode (material to be coated). As the anode, use is made of non-corrosive electrodes, such as carbon, lead dioxide, lead-tin alloy and noble metals, for example, platinum, silver and titanium-platinum alloy, and the like. Alternatively, the anode room is separated from the aqueous solution or dispersion of the electrodepositing composition by means of a partition.

The suitable concentration of the solid content in the electrodeposition bath to be used in the cathodic electrodeposition method of the present invention is 5–20% by weight similarly to the case of conventional electrodeposition baths. When the concentration is lower than 5% by weight, the throwing power of the electrodeposition bath decreases. While, when the concentration is higher than 20% by weight, the viscosity of the aqueous solution or dispersion used in the electrodeposition bath becomes high, and the film deposited on the cathode cannot be fully washed with water and further cannot be completedly finished.

It is preferable to maintain the temperature of the electrodeposition bath within the range of 15°–35°C. When the temperature is higher than 35°C, the quality of the water-soluble paint deteriorates. While, when the temperature is lower than 15°C, it is difficult to control the bath temperature to such a low temperature in summer, because the environment temperature is high.

The electrodeposition is carried out by applying a direct current voltage of 20–400 volts across the anode and cathode for a proper period of time, and then the deposited coated film is washed with water in a conventional manner. Then, an ionic radiation is irradiated on the deposited coated film to cure the film.

The ionic radiation to be used in the present invention includes accelerated electron ray, proton ray, $\alpha$-ray, $\gamma$-ray, X-ray and the like. Among these rays, the accelerated electron ray is preferable. As the source of these ionic radiations, use is made of various accelerators for electrons, strontium 90, cobalt 60 and the like.

The irradiation time is varied depending upon the radiation source. In general, cured coated films having various excellent properties are formed by an irradiation of from several seconds to several minutes. The dose rate and the amount of absorbed doses (in general, several megarads) in the irradiation can also be easily varied by varying irradiation conditions.

The present invention can be applied to the coating of any electrically conductive materials, particularly metals and alloys, such as iron, aluminum, copper, iron alloy, aluminum alloy, copper alloy, etc., and is advantageously used in various coatings, particularly in the coil coating and in the coating of thick steel sheet. Further, in the curing of the coated film, the radiation energy is utilized in a high efficiency, and the curing can be carried out continuously at high speed.

According to the present invention, all of the problems relating to the workability of a coating, to the bad smell due to volatilization of low molecular weight monomer, and to the dissolving out of metal, can be solved. Further, the method of the present invention has merits of both electrodeposition coating and curing by ionic radiation, and the resulting cured coated film is uniform and is remarkably excellent in corrosion resistance, alkali resistance and other properties. Accordingly, the present invention is very useful in industry.

The following examples are given for the purpose of illustration of this invention and are not intended as limitations thereof. In the examples, "part" and "%" mean part by weight and % by weight, respectively.

EXAMPLE 1

A mixture having the following recipe was subjected to a solution polymerization to prepare a copolymer solution.

| Recipe | Part |
| --- | --- |
| Glycidyl methacrylate | 41.93 |
| Butyl acrylate | 12.90 |
| 2-Ethylhexyl acrylate | 20.04 |
| tert-Butyl peroxybenzoate | 1.87 |
| Cyclohexanone | 23.26 |
| Total | 100.00 |

To 100 parts of the copolymer solution was added dropwise 12.21 parts of morpholine to add morpholino groups to glycidyl groups. Then, a mixture of 10.10 parts of acrylic acid and 0.18 part of hydroquinone was added dropwise to the above treated copolymer solution at 90°C to add acrylic acid to the remaining glycidyl groups, whereby acryloyl groups were introduced into the side chain of the copolymer, and a solution containing 80% of the copolymer resin was obtained.

The resin solution was neutralized with 0.8 mole of acrylic acid based on 1.0 mole of morpholine units bonded to the resin, and then diluted with water to prepare a slightly yellow-transparent aqueous solution having a resin content of 9.5% and a pH of 5.4.

The aqueous resin solution was charged into an electrodeposition cell made of polyvinyl chloride and having an inner capacity of 1l, and was kept at a temperature of 30°C and used as an electrodeposition bath. A zinc phosphate-treated electroconductive iron sheet was immersed in the aqueous solution and used as a cathode. A carbon rod was immersed in the aqueous solution and used as an anode. A direct current voltage of 70 V was applied across the electrodes for 2 minutes while stirring vigorously the aqueous solution, to effect a cathodic electrodeposition coating and to form an electrodeposited film on the zinc phosphate-treated iron sheet. The coated iron sheet was taken out from the electrodeposition cell, and washed with water. Then the iron sheet was placed on a conveyor which travelled through an electron ray irradiation room at a rate of 5 m/min, and an electron ray was irradiated on both surfaces of the coated iron sheet in a total absorbed dose of 5 megarads at 300 KV and 14 mA in the room to obtain a cured coated film.

Properties of the cured coated film are shown in the following Table 1.

Table 1

| Test | Test method | Result |
| --- | --- | --- |
| Film thickness | Magnetic film thickness tester | $22\mu$ |
| Hardness | Lead pencile (Mitsubishi Uni) | 2H |
| Adhesion | Cross-hatch test (after 1mm×1mm cut, coated film is peeled off by means of cellophane tape) | 100/100 |
| Impact resistance | Du Pont impact tester (diameter: ½ inch, weight: 500 g) | 50 cm |
| Alkali resistance | 5% NaOH aqueous solution, 48 hours | Not corroded |
| Acid resistance | 5% $H_2SO_4$ aqueous solution, 48 hours | Not corroded |

EXAMPLE 2

An epoxidized polybutadiene resin was prepared in the following manner. Butadiene was polymerized in a dispersion of sodium in tetrahydrofuran, and the reaction mass was treated with water to obtain polybutadiene having a number average molecular weight of 1,100 and having 87.8% of 1,2-bond and 10.2% of trans-1,4 bond. The resulting polybutadiene was epoxidized by peracetic acid in the presence of a sulfuric acid catalyst to obtain epoxidized polybutadiene containing 8.4% of oxilane oxygen.

To 501 parts of the resulting epoxidized polybutadiene was added 296 parts of butyl cellosolve, and the resulting mixture was kept at 50°C under stirring. After 73 parts of diethylamine was added dropwise to the mixture, the mass was heated to 95°C and maintained at this temperature for 2 hours to introduce dimethylamino groups into the epoxidized polybutadiene. Then, 2 parts of hydroquinone were added to the reaction system, and further 131 parts of acrylic acid were added dropwise thereto in 1.5 hours while keeping the temperature of the reaction system at 90°C, and an addition reaction of the acrylic acid to the above treated epoxidized polybutadiene was continued for 4 hours at this temperature to introduce acryloyl groups into the polybutadiene, whereby a solution containing 70% of the polybutadiene resin was obtained. The resin solution was neutralized with methacrylic acid and then diluted with water to obtain an aqueous solution having a resin content of 12% and a pH of 4.9.

The aqueous solution was charged into the same electrodeposition cell as used in Example 1, and a cathodic electrodeposition coating was effected in the same manner as described in Example 1, except that an electroconductive mild steel sheet was used as a cathode and a direct current voltage of 90 V was applied across the electrodes for 3 minutes, to form an electrodeposited film on the mild steel sheet. The coated steel sheet was taken out from the electrodeposition cell and washed with water. Then, the coated steel sheet was placed on a conveyor which travelled through an electron ray irradiation room at a rate of 3.3 m/min, and an electron ray was irradiated on the coated steel sheet in a total absorbed dose of 8 megarads at 300 KV and 15 mA in the room in the same manner as described in Example 1 to obtain a smooth cured coated film which did not stick at the surface.

Properties of the cured coated film are shown in the following Table 2.

Table 2

| Test | Test method | Result |
| --- | --- | --- |
| Film thickness | Magnetic film thickness tester | $15\mu$ |
| Hardness | Lead pencil (Mitsubishi Uni) | 2H |
| Adhesion | Cross-hatch test (after 1mm×1mm cut, coated film is peeled off by means of cellophane tape) | 100/100 |
| Impact resistance | Du Pont impact tester (diameter: ½ inch, weight: 500 g) | 50 cm |

EXAMPLE 3

The same resin solution as produced in Example 2, which contained 70% of resin, was made into a paint according to the following recipe by dispersing the pigments by means of a grind mill. The resulting paint was neutralized with acrylic acid and then diluted with water to obtain a diluted paint having a solid content of 10%.

| Recipe | Part |
| --- | --- |
| Resin solution produced in Example 2 (resin content 70%) | 110 |
| Rutile type titanium white | 22.5 |
| Carbon black | 0.1 |
| Titanium phosphate | 0.4 |

The diluted paint was charged into an electrodeposition cell of about 1 l capacity, kept at a temperature of 25°C, and used as an electrodeposition bath. A zinc phosphate-treated electroconductive iron sheet was used as a cathode, and a carbon rod was used as an anode, and a direct current voltage of 160 V was applied across the electrodes for 2 minutes under the condition that the distance between the electrodes was 15 cm and the area ratio of cathode/anode was 1/1, to effect a cathodic electrodeposition coating and to form an electrodeposited film on the iron sheet.

The coated iron sheet was taken out from the electrodeposition cell, washed with water and placed on a conveyor which travelled in an electron ray irradiation room at a rate of 3.3 m/min, and an electron ray was irradiated on the coated iron sheet in a total absorbed dose of 8 megarads at 300 KV and 15 mA in the room in the same manner as described in Example 1 to obtain a cured coated film having excellent corrosion resistance.

Properties of the cured coated film are shown in the following Table 3.

Table 3

| Test | Test method | Result |
| --- | --- | --- |
| Film thickness | Magnetic film thickness tester | $20\mu$ |
| Hardness | Lead pencil (Mitsubishi Uni) | 3H |
| Adhesion | Cross-hatch test (after 1mm×1mm cut, coated film is peeled off by means of cellophane tape) | 100/100 |
| Impact | Du Pont impact tester | 50 cm |

Table 3-continued

| Test | Test method | Result |
|---|---|---|
| resistance | (diameter: ½ inch, weight: 500 g) | |
| Corrosion resistance | After sprayed with 5% NaCl aqueous solution, kept at 35°C | Not corroded after 500 hrs. |

EXAMPLE 4

A mixture having the following recipe (1) was subjected to a solution polymerization to obtain a copolymer solution, to which a mixture having the following recipe (2) was added dropwise in 2 hours.

| Recipe 1 | Part |
|---|---|
| Dimethylaminoethyl methacrylate | 18.74 |
| Methacrylic acid | 8.60 |
| Azobisisobutyronitrile | 32.35 |
| Isopropyl alcohol | 20.00 |

| Recipe 2 | Part |
|---|---|
| Glycidyl acrylate | 18.59 |
| Hydroquinone | 0.23 |

After completion of the addition, the resulting mixture was heated at 80°C for 3 hours to add glycidyl acrylate groups to carboxyl groups in the copolymer and to prepare a solution of the copolymer resin.

The resulting resin solution was neutralized with acrylic acid and diluted with water to obtain an aqueous resin solution having a resin content of 8%.

The aqueous resin solution was charged into the same electrodeposition cell as used in Example 1. A cathodic electrodeposition coating was effected in the same manner as described in Example 1, except that a mild steel sheet was used as a cathode and a direct current voltage of 80 V was applied between the electrodes for 60 seconds, to form an electrodeposited film on the mild steel sheet.

The resulting coated steel sheet was taken out from the electrodeposition cell, washed with water, and placed on a conveyor which travelled in an electron ray irradiation room at a rate of 10 m/min, and an electron ray was irradiated on the coated steel sheet in the room in the same manner as described in Example 1 under the following two conditions to obtain two cured coated films. In the one, an electron ray was irradiated in a total absorbed dose of 4 megarads at 300 KV and 22 mA. In the other, an electron ray was irradiated in a total absorbed dose of 10 megarads at 300 KV and 55 mA.

Properties of the resulting coated films are shown in the following Table 4.

Table 4

| Test | Test method | Result 4 Megarads | 10 Megarads |
|---|---|---|---|
| Film thickness | Magnetic film thickness tester | 8–9μ | 8–9μ |
| Hardness | Lead pencil (Mitsubishi Uni) | H | 3H |
| Adhesion | Cross-hatch test (after 1mm×1mm cut, coated film is peeled off by means of cellophane tape) | 100/100 | 100/100 |

Table 4-continued

| Test | Test method | Result 4 Megarads | 10 Megarads |
|---|---|---|---|
| Impact resistance | Du Pont Impact tester (diameter: ½ inch, weight: 500 g) | 50 cm | 50 cm |
| Alkali resistance | 5% NaOH aqueous solution, 48 hours | Not corroded | Not corroded |
| Acid resistance | 5% $H_2SO_4$ aqueous solution, 48 hours | Not corroded | Not corroded |

EXAMPLE 5

A mixture having the following recipe (1) was subjected to a conventional solution polymerization to produce a copolymer solution, to which was added dropwise a mixture having the following recipe (2) in about 2.5 hours.

| Recipe 1 | Part |
|---|---|
| Dimethylaminoethyl methacrylate | 19.54 |
| Glycidyl methacrylate | 21.75 |
| 2-Ethylhexyl acrylate | 26.44 |
| Azobisisobutyronitrile | 1.51 |
| Butyl cellosolve | 20.00 |

| Recipe (2) | Part |
|---|---|
| Acrylic acid | 10.55 |
| Hydroquinone | 0.21 |

After completion of the addition, the resulting mixture was heated at 85°C for 4 hours to add the acrylic acid to the glycidyl groups, whereby a brown copolymer resin solution having a resin content of about 80% was obtained.

The resin solution was neutralized up to 0.9 equivalent with methacrylic acid. Then, titanium phosphate was added to the resin solution in an amount of 0.8% based on the weight of the resin and dispersed in the resin solution to prepare a paint. The paint was diluted with water so that the solid content in the diluted paint was 10%, and used as an electrodeposition coating bath. The diluted paint had a pH of 5.1.

The resulting coating bath was kept at a temperature of 25°C, and a zinc-plated steel sheet for coil coating (previously treated with zinc phosphate) was used as a cathode, and a carbon rod was used as an anode, and a cathodic electrodeposition coating was effected by applying a direct current voltage of 120 V across the electrodes for 40 seconds to form an electrodeposited film on the steel sheet. Then, the coated steel sheet was placed on a conveyor which travelled through an electron ray irradiation room at a rate of 10 m/min, and an electron ray was irradiated on the coated steel sheet in a total absorbed dose of 10 megarads at 300 KV and 55 mA in the room.

Properties of the cured coated film are shown in the following Table 5.

Table 5

| Test | Test method | Result |
|---|---|---|
| Film thickness | Magnetic film thickness tester | 3–5μ |
| Hardness | Lead pencil (Mitsubishi Uni) | 3H |
| Adhesion | Cross-hatch test (after 1mm×1mm cut, coated film is peeled off by means of cellophane tape) | 100/100 |
| Impact | Du Pont impact tester | 50 cm |

Table 5-continued

| Test | Test method | Result |
| --- | --- | --- |
| resistance | (diameter: ½ inch, weight: 500 g) | |
| Corrosion resistance | After sprayed with 5% NaCl aqueous solution, kept at 35°C | Not corroded after 500 hrs. |

EXAMPLE 6

A resin solution was prepared according to the following recipe in the same manner as described in Example 5.

| Recipe | Part |
| --- | --- |
| N-vinylimidazole | 14.26 |
| Glycidyl methacrylate | 19.09 |
| Butyl acrylate | 27.37 |
| Azobisisobutyronitrile | 1.14 |
| Isobutyl alcohol | 29.00 |
| Acrylic acid | 8.97 |
| Hydroquinone | 0.15 |

The resin solution was neutralized with 0.95 mole, based on 1 mole of N-vinylimidazole, of acrylic acid, and diluted with water to prepare an opalescent aqueous dispersion having a resin content of 10%.

The resulting aqueous dispersion was charged into the same electrodeposition cell as used in Example 1, and a cathodic electrodeposition coating was effected in the same manner as described in Example 1, except that a mild steel sheet was used as a cathode and a direct current voltage of 90 V was applied for 2 minutes. The coated steel sheet was placed on a conveyor which travelled through an electron ray irradiation room at a rate of 3.3 m/min, and an electron ray was irradiated on the coated steel sheet in a total absorbed dose of 8 megarads at 300 KV and 15 mA.

Properties of the cured coated film are shown in the following Table 6.

Table 6

| Test | Test method | Result |
| --- | --- | --- |
| Film thickness | Magnetic film thickness tester | 8μ |
| Hardness | Lead pencil (Mitsubishi Uni) | 2H |
| Adhesion | Cross-hatch test (after 1mm×1mm cut, coated film is peeled off by means of cellophane tape) | 100/100 |
| Impact resistance | Du Pont impact tester (diameter: ½ inch, weight: 500 g) | 50 cm |

EXAMPLE 7

A resin solution was prepared according to the following recipe in the same manner as described in Example 4.

| Recipe | Part |
| --- | --- |
| N-Vinylimidazole | 14.91 |
| Methacrylic acid | 7.53 |
| 2-Ethylhexyl acrylate | 23.22 |
| Styrene | 10.11 |
| Azobisisobutyronitrile | 1.43 |
| n-Butyl alcohol | 14.00 |
| Dioxane | 15.50 |
| Glycidyl methacrylate | 13.09 |
| Hydroquinone | 0.21 |

The resin solution was neutralized with acrylic acid and then diluted with water to adjust the resin content in the resulting aqueous resin solution to 10%.

The aqueous resin solution was charged into the same electrodeposition cell as used in Example 1, and a cathodic electrodeposition coating was effected in the same manner as described in Example 1, except that a mild steel sheet was used as a cathode and a direct current voltage of 100 V was applied for 30 seconds or 60 seconds, to obtain coated steel sheets. An electron ray was irradiated on each of the coated steel sheets in a total absorbed dose of 8 megarads at 300 KV and 44 mA at a conveyor speed of 10 m/min in an electron ray irradiation room to obtain cured coated films.

Properties of the cured coated films are shown in the following Table 7.

Table 7

| Test | Test method | Result 100 V, 30 sec. | 100V, 60 sec. |
| --- | --- | --- | --- |
| Film thickness | Magnetic film thickness tester | 3–5μ | 7–9μ |
| Hardness | Lead pencil (Mitsubishi Uni) | 2H | 2H |
| Adhesion | Cross-hatch test (after 1mm×1mm cut, coated film is peeled off by means of cellophane tape) | 100/100 | 100/100 |
| Impact resistance | Du Pont impact tester (diameter: ½ inch, weight: 500 g) | 50 cm | 50 cm |
| Alkali resistance | 5% NaOH aqueous solution, 48 hours | Not corroded | Not corroded |
| Acid resistance | 5% $H_2SO_4$ aqueous solution, 48 hours | Not corroded | Not corroded |

EXAMPLE 8

The same resin solution as prepared in Example 2 was neutralized with acrylic acid, and a cured coated film was produced in the same manner as described in Example 2.

Properties of the cured coated film are shown in the following Table 8.

Table 8

| Test | Test method | Result |
| --- | --- | --- |
| Film thickness | Magnetic film thickness tester | 14μ |
| Hardness | Lead pencil (Mitsubishi Uni) | 2H |
| Adhesion | Cross-hatch test (after 1mm×1mm cut, coated film is peeled off by means of cellophane tape) | 100/100 |
| Impact resistance | Du Pont impact tester (diameter: ½ inch, weight: 500 g) | 50 cm |

What is claimed is:

1. A method for forming smooth cured coated films, which comprises electrodepositing and coating a film on an electroconductive material in an electrodeposition bath containing a cationically electrodepositing composition, which is composed of a polymer resin having amino groups and at least one of acryloyl groups and methacryloyl groups and of at least one of acrylic acid and methacrylic acid, by using said electroconductive material as a cathode, and curing said coated film by the irradiation of an ionic radiation.

2. The method according to claim 1, wherein said polymer resin is glycidyl group-containing acrylic copolymer base resin.

3. The method according to claim 1, wherein said polymer resin is amino group-containing acrylic copolymer base resin or amino group-containing vinyl copolymer base resin.

4. The method according to claim 1, wherein said polymer resin is glycidyl group-containing acrylic compound/amino group-containing acrylic compound copolymer base resin or glycidyl group-containing acrylic compound/amino group-containing vinyl compound copolymer base resin.

5. The method according to claim 1, wherein said polymer resin is epoxidized polyalkadiene base resin.

6. The method according to claim 1, wherein said polymer resin contains 1–6 acryloyl groups and/or methacryloyl groups per one molecule of the resin.

7. The method according to claim 1, wherein said polymer resin contains amino groups in such an amount that the molecular weight of the resin per one amino group is 300–1,000.

8. The method according to claim 1, wherein said cationically electrodepositing composition contains acrylic acid and/or methacrylic acid in an amount of 0.3–1.5 equivalents based on the amino groups of the polymer resin.

9. The method according to claim 1, wherein the concentration of solid content in the electrodeposition bath is 5–20% by weight.

10. The method according to claim 1, wherein the electrodeposition is effected at a bath temperature of 15°–35°C.

11. The method according to claim 1, wherein a direct current voltage of 20–400 V is applied across both electrodes in the electrodeposition.

* * * * *